United States Patent
Fink et al.

(10) Patent No.: US 9,916,469 B2
(45) Date of Patent: Mar. 13, 2018

(54) SYSTEMS, METHODS, AND DEVICES FOR SECURING DATA STORED IN A CLOUD ENVIRONMENT

(71) Applicant: MASTERCARD INTERNATIONAL INCORPORATED, Purchase, NY (US)

(72) Inventors: David A. Fink, Chesterfield, MO (US); Gang David Sun, Chesterfield, MO (US); Moira McCauley, Wentzville, MO (US); Lisa Paulette Navarrette, Lake St. Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 100 days.

(21) Appl. No.: 14/972,337

(22) Filed: Dec. 17, 2015

(65) Prior Publication Data

US 2017/0177890 A1    Jun. 22, 2017

(51) Int. Cl.
*G06F 21/62* (2013.01)
*G06F 7/58* (2006.01)
(Continued)

(52) U.S. Cl.
CPC .......... *G06F 21/6218* (2013.01); *G06F 7/588* (2013.01); *G06F 17/30312* (2013.01);
(Continued)

(58) Field of Classification Search
None
See application file for complete search history.

(56) References Cited

U.S. PATENT DOCUMENTS

| | | | |
|---|---|---|---|
| 6,859,808 B1 * | 2/2005 | Chong | G06F 17/30327 707/741 |
| 8,463,752 B2 * | 6/2013 | Brinkmoeller | G06F 21/6254 707/662 |

(Continued)

OTHER PUBLICATIONS

Zhang et al.; An efficient quasi-identifier index based approach for privacy preservation over inecremental data sets on cloud; 2012; Retrieved from the Internet <URL: http://www.sciencedirect.com/science/article/pii/S0022000012001766>; pp. 1-14 as printed.*

(Continued)

*Primary Examiner* — Saleh Najjar
*Assistant Examiner* — Michael Chao
(74) *Attorney, Agent, or Firm* — Seyfarth Shaw LLP; Brian Michaelis

(57) ABSTRACT

Devices, systems, and methods for performing particularized encryption of confidential information within real-world data files that are subsequently stored within a cloud environment are described. Specific rules/logic are executed in a local computing environment to identify the type(s) and/or magnitude(s) of confidential information contained within each real-world data file. The identified type(s) and/or magnitude(s) of confidential information is thereafter specifically encrypted using various encryption processes. Once encrypted, the data is packaged and stored within a cloud environment without the need for further encryption at either the local computing or cloud environments.

20 Claims, 8 Drawing Sheets

(51) Int. Cl.
*G06F 17/30* (2006.01)
H04L 29/06 (2006.01)
G06F 3/06 (2006.01)

(52) U.S. Cl.
CPC .......... *G06F 21/6254* (2013.01); *G06F 3/067* (2013.01); *H04L 63/105* (2013.01)

(56) References Cited

U.S. PATENT DOCUMENTS

| | | | |
|---|---|---|---|
| 9,465,954 B1* | 10/2016 | Speedie | G06F 21/6227 |
| 2008/0065665 A1* | 3/2008 | Pomroy | G06F 17/30286 |
| 2008/0270370 A1* | 10/2008 | Castellanos | G06F 21/6227 |
| 2009/0204631 A1* | 8/2009 | Pomroy | G06F 21/6227 |
| 2009/0271361 A1* | 10/2009 | Pattabhi | G06F 17/30306 |
| 2015/0007249 A1* | 1/2015 | Bezzi | G06F 21/6227 726/1 |
| 2015/0371613 A1* | 12/2015 | Patel | G06F 21/10 345/549 |

OTHER PUBLICATIONS

Sweeney, Latanya; K-Anonymity: A Model for Protecting PRivacy; 2002; Retrieved from the Internet <URL: http://cs.engr.uky.edu/~jzhang/CS689/PPDM-Sweeney2002.pdf>; pp. 1-14 as printed.*

* cited by examiner

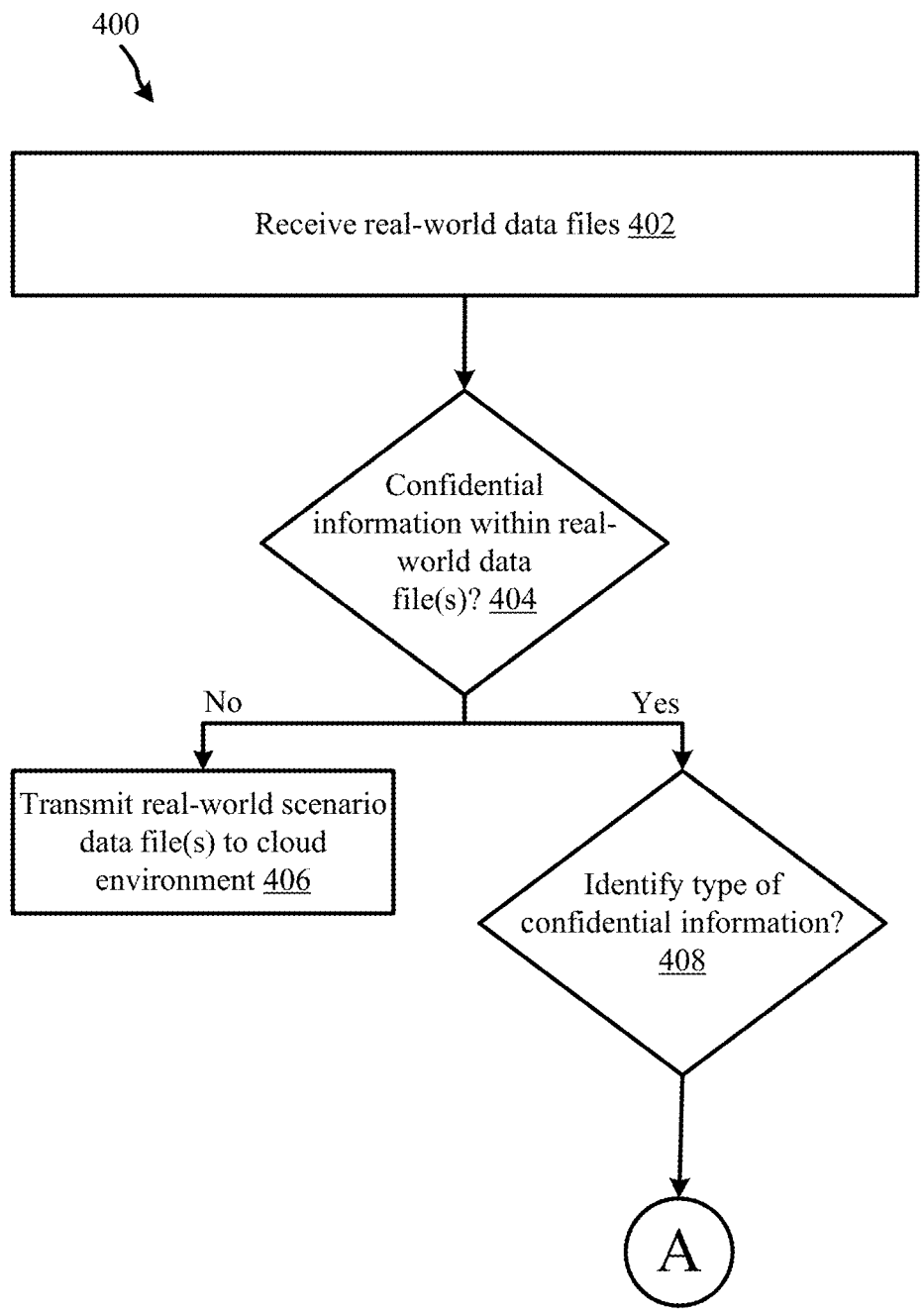

SYSTEMS, METHODS, AND DEVICES FOR SECURING DATA STORED IN A CLOUD ENVIRONMENT

FIELD OF TECHNOLOGY

The present disclosure relates generally to data security.

BACKGROUND

Various industries benefit from using results oriented data to predict future real-world scenarios. Often times, entities generate hypothetical, made-up datasets that are subsequently used to predict real-world scenarios. This results in unreliable predicted scenarios having little to no correlation with what is actually experienced.

Traditionally, entities kept the real-world scenarios relatively secret, thereby ensuring unauthorized access to confidential information within the real-world scenarios data did not occur. With the advent of the digital revolution, entities realized the benefit of storing the real-world scenarios in third party locations, such as cloud environments, to open up local storage for other beneficial uses. However, since cloud environments are generally unsecure, complex encryption and hashing processes were performed on all the information (both confidential and public) within real-world scenarios data prior to storage of the data within the cloud environments. This processing is cumbersome and unnecessarily takes up processing power of local computing environments that could be used more beneficially in other ways.

SUMMARY

The present disclosure generally provides systems, apparatuses, and methods specially configured for processing real-world data to identify confidential information therein, and for specifically and selectively securing, such as by encryption, hashing or the like, the identified confidential information using various sanitization routines. The real-world data may alternatively or additionally be analyzed to identify degrees of confidential information therein (e.g. highly confidential, confidential, etc.), with each classification or degree being sanitized using a specific, respective methodology. Accordingly, the confidential information within the real-world data is selectively sanitized or secured to produce real-world scenario data that is incapable of being reverse engineered into the confidential information. This processing and securing of the real-world data is efficiently performed within a local computing environment prior to the real-world scenarios data being transmitted to a cloud environment.

According to the disclosure, real-world data containing confidential information is received by and stored within a specially configured and secure database. A processing unit accesses the stored real-world data and applies specific rules/logic to identify the confidential information contained within the real-world data. The processing unit may also identify one or more classifications of confidential information.

The processing unit (or a different processing unit depending upon implementation) thereafter applies specific sanitization or security processes to the confidential information of the real-world data. For example, each classification or type and/or magnitude of confidential information may trigger a different encryption process or an encryption process can be implemented with respect to several different types and/or magnitudes of confidential information. The sanitization processes of the present disclosure transform the real-world data into real-world scenario data that is stored within a cloud environment with a higher, and appropriate, level of confidence that the confidential information within the data cannot be breached. It should be appreciated by those skilled in the art that sanitization routines could include, in addition or as an alternative to, encryption, alternative security techniques such as hashing or the like.

According to traditional techniques, all information (both confidential and public) to be stored within a cloud environment would undergo complex encryption and/or hashing processes. This resulted in lengthy processing times and the unnecessary syphoning of processing power from other beneficial uses. In contrast, the present disclosure provides for faster processing of data prior to storage to the cloud environment because only non-public, confidential information identified within the real-world data is secured. This is beneficial in light of the fact that the structured database described herein may receive millions of real-world data files on a monthly basis. When processing that magnitude of files, merely needing to process/secure confidential portions of data files as described herein decreases processing latency on a significant level. Network communications with a network of systems processing the confidential information is similarly improved.

BRIEF DESCRIPTION OF THE DRAWINGS

Embodiments of devices, systems, and methods are illustrated in the figures of the accompanying drawings which are meant to be exemplary and non-limiting, in which like references are intended to refer to like or corresponding parts, and in which:

FIGS. 4A and 4B illustrate a process flow diagram detailing a method for performing particularized local sanitization of confidential information/data contained within individual data files prior to storage of the data in a cloud environment according to the present disclosure.

DETAILED DESCRIPTION

The detailed description of aspects of the present disclosure set forth herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, references to a singular embodiment may include plural embodiments, and references to more than one component may include a singular embodiment.

The present disclosure generally relates to local, particularized securing or sanitization, such as by encryption, of confidential portions of real-world data files that are subsequently stored within a cloud environment as real-world scenario files. Real-world data files are received by and stored within a structured database specially configured to allow low latency processing of the data to determine confidential information contained therein by a local processing unit. The local processing unit identifies type(s) and/or magnitudes of confidential data contained within each real-world data file. This may be performed using field names of data tables within a structured database.

The local processing unit (or another local processing unit depending upon implementation) applies a selected, respective sanitization routine or routines, e.g. encryption processes, to each type of confidential information identified based on field name of the data within the specially structured database, thereby transforming the real-world data file containing the confidential information into a real-world scenario file containing selectively secured confidential information. In an example, each type of confidential data triggers a separate and distinct encryption process. The real-world scenario data file is stored within a cloud environment without the need for further encryption at either the local computing or cloud environments.

Figure 1:
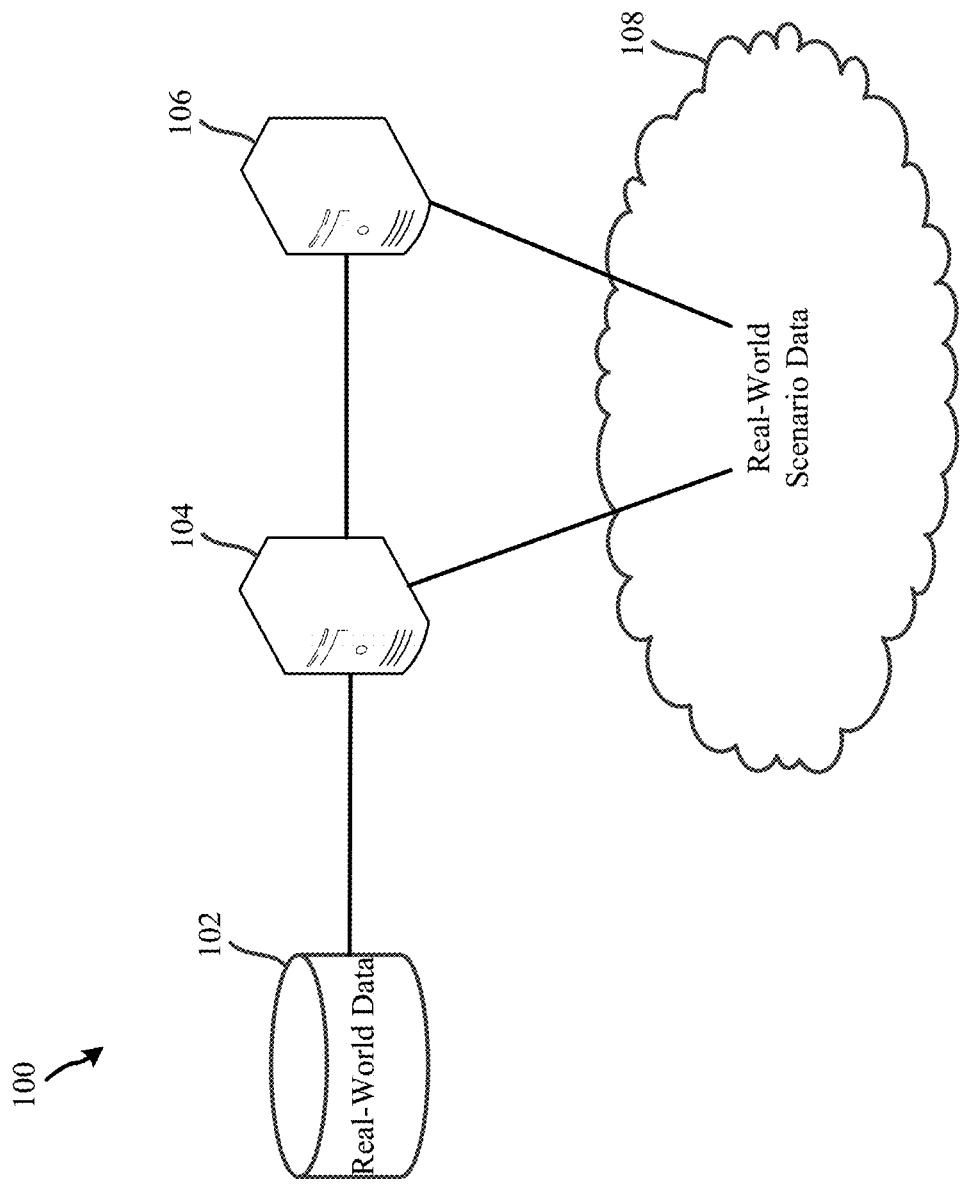
FIG. 1 illustrates a system specially configured to perform local security processing of confidential information contained within individual data files prior to storage of the data in a cloud environment according to the present disclosure.

Referring to FIG. 1, a system 100 specially configured to perform local encryption of confidential information contained within individual data files prior to storage of the data in a cloud environment is described. The system 100 includes a structured database 102 that stores real-world data files specifically stored for subsequent processing. The real-world data files may be received from third-party databases such as, for example, Netezza, Oracle, and Hadoop. Receipt of the real-world data files may occur passively or actively (i.e, the real-world data files may be pushed from the third-party databases to the structured database 102, or the computing device(s) 104, 106 described herein below may actively pull real-world data files from the third-party databases).

For example, a format of a received real-world data file may be manipulated into a preferred storage format that allows for confidential information within the real-world data file to be easily identified using tailored rules/logic described herein.

The database 102 may be a structured query language ("SQL") environment containing various tables, with each of the tables including information from multiple real-world data files that share a common feature. Specific structuring of the database 102 described herein reduces processing latency, especially when the database 102 receives millions of real-world data files a month, for example.

The system 100 also includes a local computing device 104 specially configured to perform identification of, as well as processing to apply selective, respective sanitization routines to, confidential information within each real-world data file stored in the database 102. The local computing device 104 communicates with a memory (not illustrated) that includes rules/logic that, when executed by the local computing device 104, provide parameters for identifying types of confidential information.

In an illustrative implementation, the rules/logic of the memory, when executed, provide parameters for identifying confidential data or types or magnitudes of confidential information/data within the real-world data. The data may include highly confidential and confidential and public data, for example. By way of example, in a secure network for payment processing related to credit transactions, the account owner identification information for a payment transaction may be designated highly confidential. Account owner social security number, credit (e.g. card) account number and security codes may be identified as highly confidential information by applying rules to identify the number structure of the information (e.g. by parsing a data field to determine if it has the XXX-XX-XXXX structure associated with an account owner's social security number. Further, an account owner's contact information, such as personal telephone number, may be maintained and classified as confidential information. In similar fashion to identification of highly confidential information, the confidential information may be identified and classified as a function of rules applied to identify the structure, characters (numeric or alphanumeric, etc.) identified in the confidential information. Likewise, public information such as account owner address information may be similarly identified and classified as public information.

Confidential information corresponding with a particular type of confidential data is subjected to a selected, respective sanitization routine, such as applying a particular encryption routine, by either the local computing device 104, or another local computing device 106 depending upon implementation. In an illustrative implementation, the local computing device 104 may be a highly secure local computing device implementing the sanitization routines as discussed herein, behind the second computing device 106 implementing a firewall and network communications apart from the highly secure local computing device used in processing highly confidential information locally. The second computing device implements a network interface to the cloud storage 108 where real-world scenario data is stored after being locally processed and secured at the local, highly secure computing device 104.

In an example, each type of confidential data triggers a specific type of sanitization routine or rules at the local computing device 104. However, one skilled in the art should appreciate a specific encryption protocol, or hashing, or combination thereof may be triggered by more than one type of confidential data without departing from the scope of the present disclosure. Each of the sanitization processes described herein may be performed on a single real-world data file's confidential information at once or a sanitization process may be batch performed on more than one real-world data file's confidential information at once.

Figure 2:
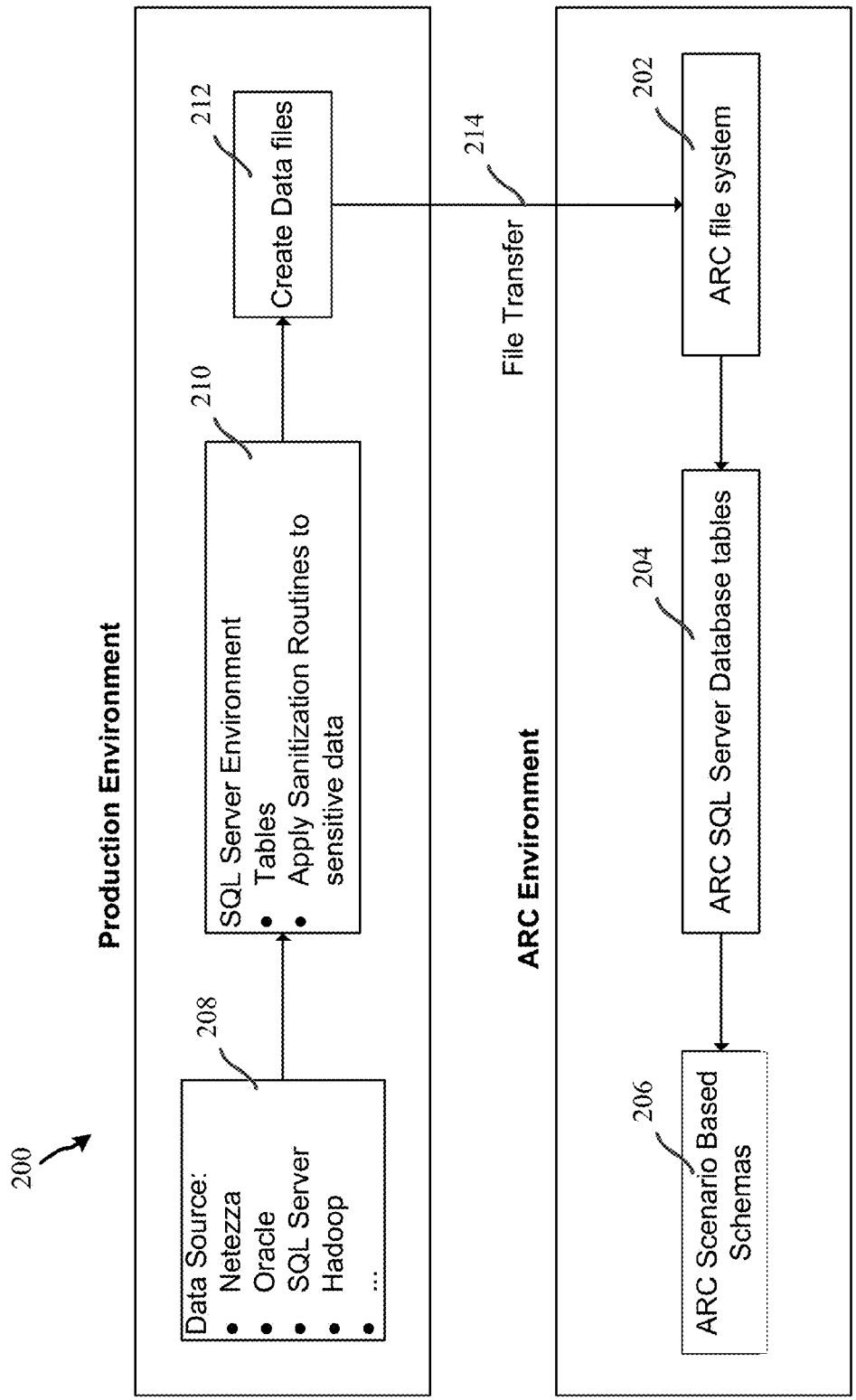
FIG. 2 is a block diagram illustrating a specially configured illustrative network implementing data security sanitization routines according to the disclosure.

FIG. 2 illustrates a block diagram of a specially configured illustrative network implementing data security sanitization routines according to the disclosure. In the illustration, an Analytics Research Center (ARC) 200 provides the ability to support multiple research groups, product development initiatives, pilot (alpha/beta) software development initiates, concept validation, data review, among other types of initiatives. Many of these initiatives require the use of data to enable evaluation of a particular program. The intent is to be able to support 'business scenario' information based upon business results or other empirical (generally confidential) data. A 'business scenario' can be defined as business trends, based upon results, which can be viewed over time from different perspectives. Typical data associated with business scenarios are time, geography, product, customer, merchant, etc.

The Analytics Research Center is hosted in a cloud environment, such as Amazon Web Services (AWS), the Microsoft Azure Cloud environment, or the like, generically referred to herein as "the cloud." The cloud environment, in this illustrative ARC embodiment, may generally include a file system 202 for managing storage of data as it is imported or exported into the cloud environment. The ARC environment 200 may generally include database infrastructure 204, such as a SQL server for structured database storage, searching and access according to a storage schema such as database tables as a function of the initiatives implementing the ARC environment. Further, the ARC environment 200 may generally include scenario based schemas 206 that can be implemented or accessed as a function of the initiatives implementing the ARC environment.

Since the ARC environment 200 is hosted in an external cloud, it is essential that any 'business scenario' information maintained not be of any business value nor be able to be reverse-engineered to ascertain proprietary business results.

In order to sustain those criteria (i.e. that confidential information be subject to heightened levels of security than may be available in a cloud environment), information security may be implemented according to this disclosure by 'sanitizing' proprietary/confidential information such that any ability to glean value or ascertain actual business results is removed. Accordingly, still referring to FIG. 2, any data, such as data sources 208 that may be accessed, developed or gathered and used in internal business processes, to be hosted in the ARC/cloud environment 200 must undergo a review process. The review process is implemented in a secure server environment 210, e.g. a SQL server environment, behind a firewall remote from the cloud environment 200. Generally, any non-public information may be identified, classified and assigned/stored in tables as a function of classification/category. Subsequently, such non-public information may be identified and assigned a sanitation routine prior to enabling its hosting in the ARC. These sanitation routines are applied behind firewalls and the results of those sanitation processes create the 'business scenario' information that may be managed as secured data files 212 that can then be transferred 214 beyond the firewall and hosted in the ARC cloud environment 200.

According to the disclosure, for example, one type of confidential data may trigger RAND encryption processes. The RAND function generates a random number (i.e., decimal) between zero (0) and one (1). For example, a RAND encryption routine may be represented by Formula 1 below. Since Formula 1 generates an encrypted value at a local environment using two variables (i.e., ROWID and Data Value), reverse engineering of the data in the cloud environment is impossible.

$$\text{round}(\text{RAND}([\text{ROWID}])*[\text{Data Field Value}])*[\text{Data Field Value}],0) \quad \text{Formula 1}$$

wherein:
ROWID is the data file's location within a sorting order; and
Data Field Value is the value of the data at a particular location within the database 102.

Figure 6:
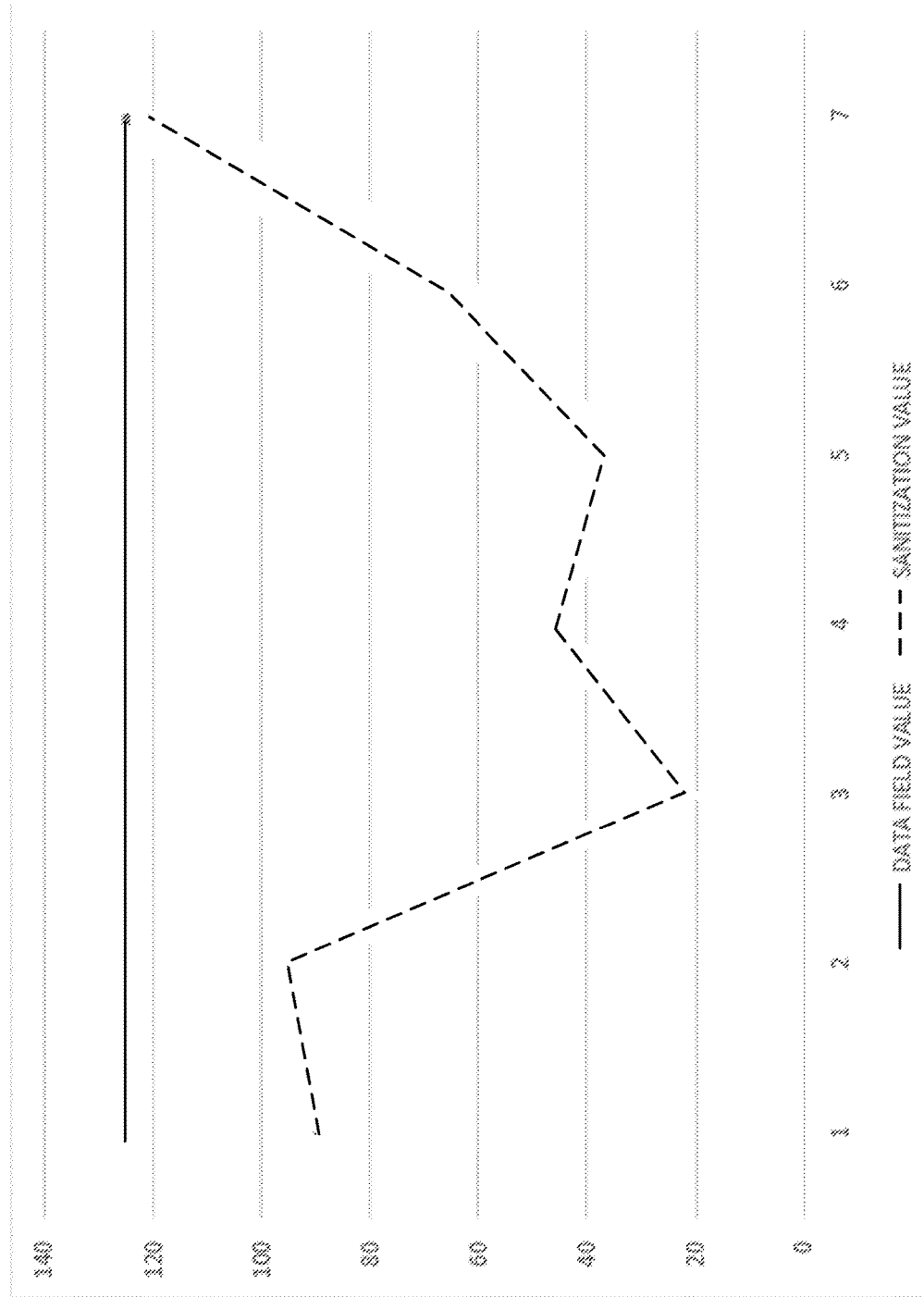
FIG. 6 illustrates the results of encryption according to Formula 1 according to the present disclosure.

The Data Value of Formula 1 may be a set common value within the real-world data that has confidential and proprietary value. For example, it may be beneficial to hide the fact that certain data correlates to the common field value. An example of the results of encryption according to Formula 1 herein is illustrated in Table 1 below and FIG. 6.

TABLE 1

Results of encryption according to Formula 1.

| Real-World Data Field Value | ROWID | Real-World Scenario Encrypted Value |
|---|---|---|
| 125 | 2 | 90 |
| 125 | 20 | 95 |
| 125 | 200 | 22 |
| 125 | 2000 | 46 |
| 125 | 20000 | 37 |
| 125 | 200000 | 67 |
| 125 | 2000000 | 120 |

Another type of confidential data may trigger obfuscation encryption processes. The obfuscation encryption processes complicate the confidential information of the real-world data. For example, the obfuscation encryption processes may change certain common field values (having confidential, proprietary, or trade secret significance) into generalized data. An example of the results of the obfuscation encryption processes is illustrated in Table 2 below.

TABLE 2

Results of obfuscation encryption processes.

| Real-World ID | Real-World Name | Real-World Code | Real-World Scenario Encrypted (Obfuscated) ID | Real-World Scenario Encrypted (Obfuscated) Name | Real-World Scenario Encrypted (Obfuscated) Code |
|---|---|---|---|---|---|
| 3 | Entity Name 1 | Code 1 | 1 | Entity 1 | C1 |
| 5 | Entity Name 2 | Code 2 | 2 | Entity 2 | C2 |
| 14 | Entity Name 3 | Code 3 | 3 | Entity 3 | C3 |
| 21 | Entity Name 4 | Code 4 | 4 | Entity 4 | C4 |
| 25 | Entity Name 5 | Code 5 | 5 | Entity 5 | C5 |
| 26 | Entity Name 6 | Code 6 | 6 | Entity 6 | C6 |
| 71 | Entity Name 7 | Code 7 | 7 | Entity 7 | C7 |
| 72 | Entity Name 8 | Code 8 | 8 | Entity 8 | C8 |
| 73 | Entity Name 9 | Code 9 | 9 | Entity 9 | C9 |

In Table 2, each line item in the name column may be the name of a different entity. After obfuscation, the value corresponding to the name in the real-world data is merely the word "name" with a sequential number after it in the real-world scenario data. Likewise, each line item of the code column may be a different alpha, numeric, or alpha-numeric code that, when obfuscated, results in the letter "C" followed by a sequential number.

A further type of confidential data may trigger switching encryption processes. An SQL server mod function may be used to reassign a switch correlating to a ROWID. For example, if the ROWID is an odd number, the encrypted value may be "1" or "N". If the ROWID is an even number, the encrypted value may be a "0" or "Y".

Upon the confidential information within the real-world data being encrypted or otherwise secured as described herein to produce real-world scenario data, the real-world scenario data is either stored back in the structured database 102 or a separate structured database (not illustrated). The locally stored real-world scenario files are transmitted by either the local computing device 104 or local computing device 106 depending upon implementation, to a cloud environment 108. This frees up local memory space for other beneficial uses.

Figure 3:
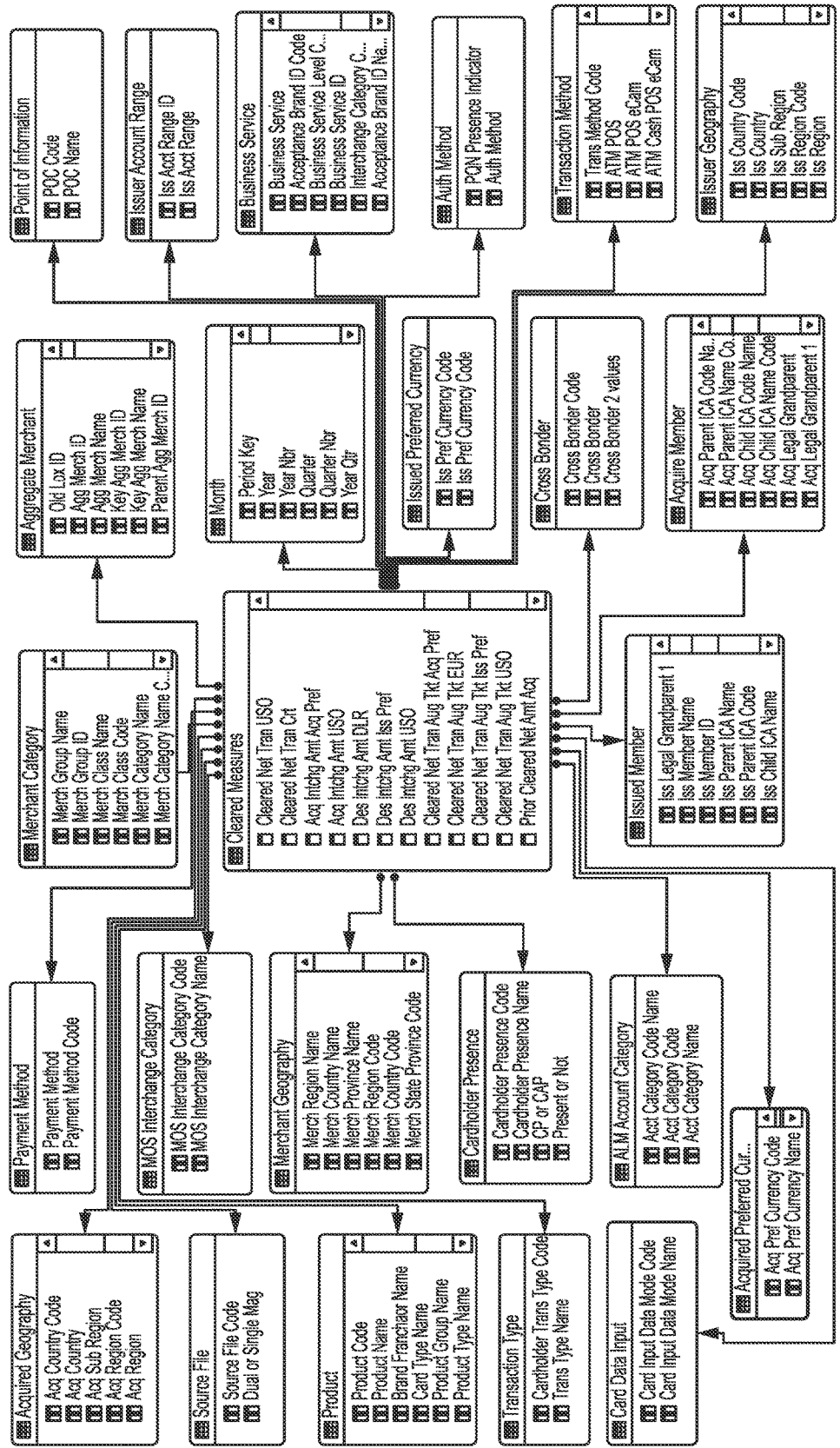
FIG. 3 is a schema of a database specially configured to store real-world data for identification of confidential information contained within individual data files according to the present disclosure.

Attention is now given to FIG. 3, which illustrates an illustrative schema of a database specially configured to store real-world data for easy identification of confidential information contained within individual data files according to the present disclosure. As illustrated, data tables may be used. An illustrative list of data table headings includes acquirer geography, source file, product, transaction type, card data input, payment method, MDS interchange category, merchant geography, cardholder presence, ALM account category, acquirer preferred currency, merchant category, cleared measures, issuer member, aggregate merchant, month, issuer preferred currency, cross border, acquirer member, point of interaction, issuer account range, business service, authorization method, transaction method, and issuer geography. One skilled in the art should appreciate that other table headings may be used instead of or in addition to the headings listing above.

Use of table headings may be selected to provide expedient analysis of real-world data to identify confidential information therein. Particular data tables may be associated with particular confidential data (or vice versa) and/or types of confidential data. Behind the firewall, data should be organized within the specialized database so that confidential data files may be most readily accessed and subjected to sanitization as described herein.

Figure 4B:
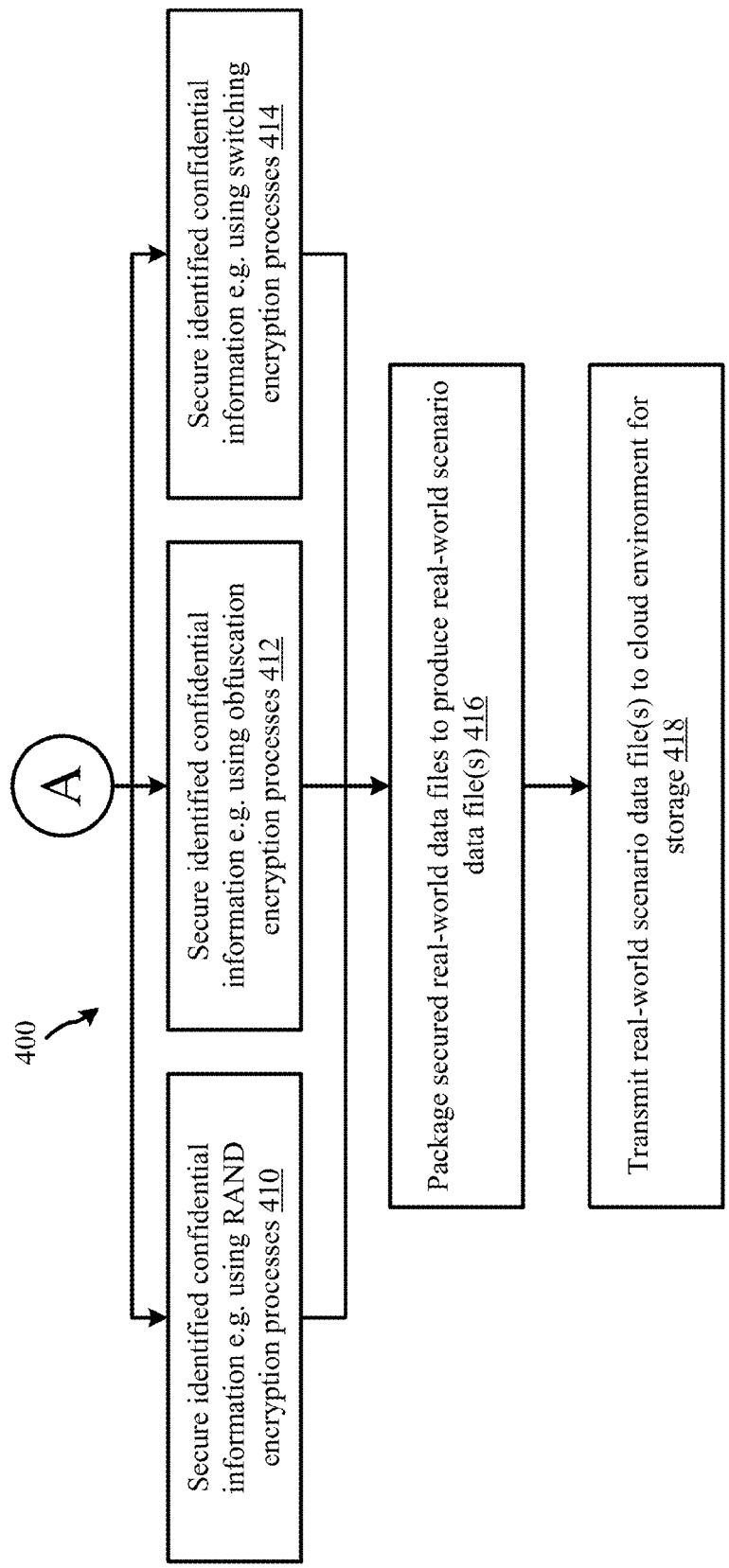

Attention is now given to FIGS. 4A and 4B, which illustrate a method 400 for performing particularized local sanitization, e.g. via encryption of confidential information, contained within individual data files prior to transmission or storage of the data in a cloud environment. At block 402 real-world data is received by a local computing device. Receipt of the real-world data may be performed passively or it may be performed actively (i.e., the local computing device pulls the real-world data from a non-local data storage). The received real-world data is stored within a structured local database in communication with the local computing device (not illustrated). For example, a format of the received real-world data may be manipulated by the local computing device into a preferred storage format that allows for confidential information within the real-world data to be easily identified using specially tailored rules/logic. The database may be a structured query language ("SQL") environment containing various tables, with each of the tables including portions of real-world data files that share a common feature.

At decision point 404 the local computing device determines whether confidential information is contained within one or more of the received real-world data files. If no confidential information is identified (i.e., the real-world data only contains public data), the real-world data files are transmitted by the local computing device to a cloud environment, for storage, as real-world scenario data file(s) (illustrated as block 406).

If confidential information is identified, the type of identified confidential information is determined by the local computing device (illustrated as decision point 408) (e.g., as a function of field name and/or table heading within the specially structured database). An exemplary, non-limiting list of field names including highly confidential or confidential information may include source file, product, transaction type, card data input, payment method, cardholder presence, account category, acquirer preferred currency, merchant category, issuer member, issuer preferred currency, point of interaction, business service, authorization method, transaction method, and issuer geography. One skilled in the art should appreciate that other types of data may be identified or required to be "confidential" for example as a function of local/regional laws, regulations, privacy policies or the like. Different types of confidential information are secured, e.g. encrypted, hashed or the like, using different processes as described herein. Only the confidential information within a real-world data file is selectively secured/encrypted while the non-confidential information is not secured/encrypted.

At block 410 the local computing device selectively secures a type of confidential information using a respective sanitization routine, e.g. encrypts one classification of confidential information using RAND encryption processes as described herein above with regard to FIG. 1. At block 412 the local computing device secures another type of confidential information using a respective sanitization routine, e.g. encrypts another classification of confidential information using obfuscation encryption processes as described herein above with regard to FIG. 1. At block 414 the local computing device secures yet another type of confidential information using a respective sanitization routine, e.g. encrypts an additional classification of confidential information using switching encryption processes as described herein above with regarding to FIG. 1.

In this illustrative implementation, the real-world data files containing encrypted confidential information are packaged to produce real-world scenario data file(s) (illustrated as block 416) that are transmitted to a cloud environment for storage (illustrated as block 418). Each real-world scenario file may contain data from multiple real-world data files. By storing the real-world scenario data file(s) within the cloud environment, local memory is freed up for other beneficial uses. Further, since the confidential information is specially encrypted within a local computing environment, there is no need to specially encrypt the cloud environment.

Figure 5A:
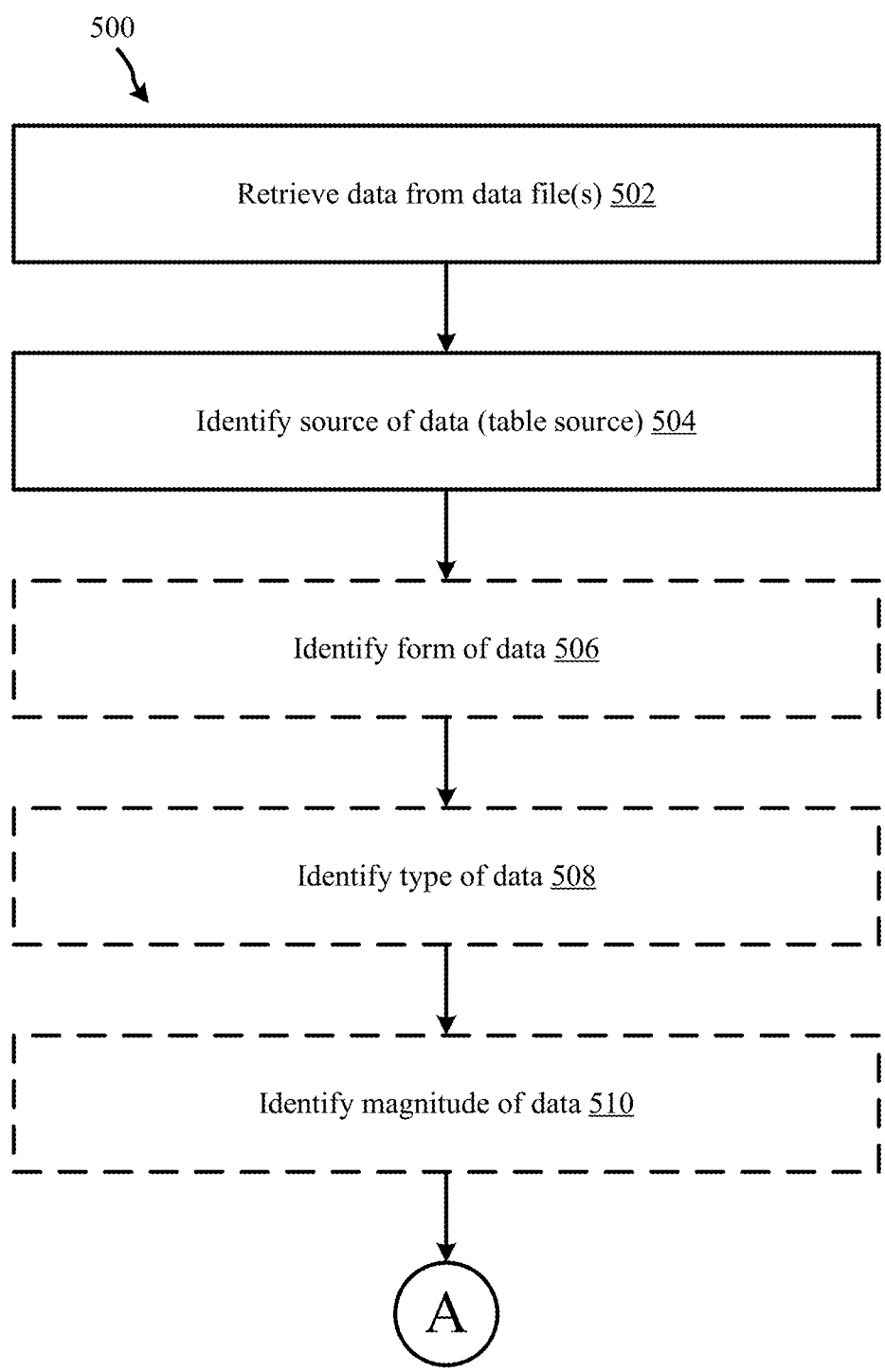
FIGS. 5A and 5B illustrate a further process flow diagram detailing a method for performing particularized local sanitization of confidential information/data contained within data files prior to storage of the data in a cloud environment according to the present disclosure.
Figure 5B:
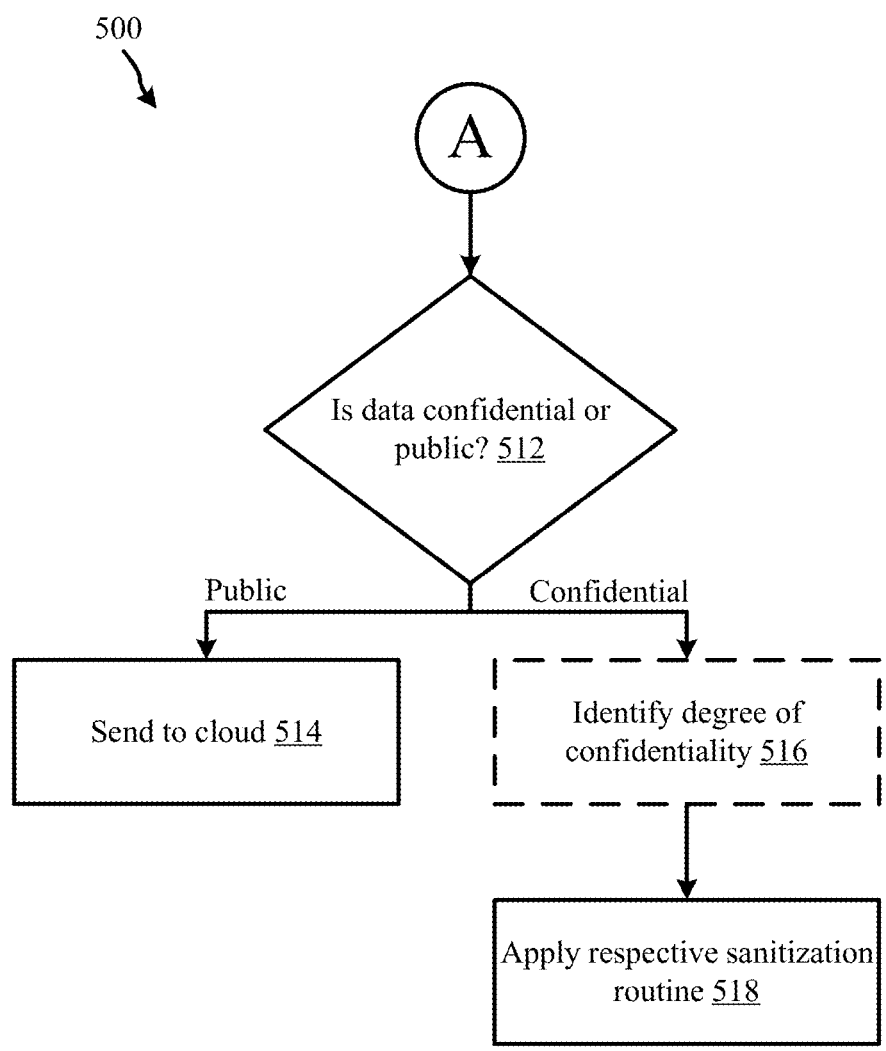

A further implementation of a method for performing particularized local sanitization of confidential information/data contained within data files prior to storage of the data in a cloud environment according to the present disclosure is illustrated in the process flow diagram of FIGS. 5A and 5B. As illustrated, data is retrieved 502 from data file(s) within the specialized data base as described herein. The source, for example the table source of the data is identified, 504. Data may be classified as confidential and subject to a particular sanitization merely based on the table (e.g. table heading) from which the data is retrieved. Alternatively (and optionally), confidential data may be identified by its form 506 (e.g. the form of a numerical data object such as social security number, telephone number, credit card number or the like). As a further alternative/option, confidential data may be identified by its data type 508 (e.g. medical data, financial data, personal data, security data or the like). Still further (and optionally), confidential data may be identified by its magnitude 510 (for example, large amounts of data or data files of different sizes may be associated with confidential or secure data sources, which may also be a basis to identify confidential data by type). The data retrieved from the specialized data base is subject to a determination as to whether it meets criteria for confidentiality 512 (such as described above). Public data may be readily sent to a cloud environment 514 for further processing as known in the art. Degree of confidentiality of the sourced data may be optionally determined 516. Ultimately, the confidential data is subjected to a respective sanitization routine 518.

The computer systems and devices described herein each contain a memory that will configure associated processors to implement methods, steps, and functions described herein.

Computers in the specially configured network discussed herein may be interconnected, for example, by one or more of network, a virtual private network (VPN), the Internet, a local area and/or wide area network (LAN and/or WAN), via an EDI layer, and so on. As described herein the network may include a cloud, cloud computing system, or electronic communications system or method that incorporates hardware and/or software components. Communication among the parties may be accomplished through suitable communication channels, such as, for example, a telephone network, an extranet, an intranet, the Internet, online communications, satellite communications, off-line communications, wireless communications, transponder communications, local area network (LAN), wide area network (WAN), virtual private network (VPN), and combinations thereof.

The present system or any part(s) or function(s) thereof are implemented in one or more specially configured computer systems or other processing systems specially configured for securing confidential data as described herein. Databases or data warehouses specially configured as discussed herein may include relational, hierarchical, graphical, or object-oriented structure and/or various other particularly structured database configurations implementing data storage for the specially configured machine/system. Moreover, the databases may be organized as data tables or lookup tables. Each record may be a single file, a series of files, a linked series of data fields, or other data structure. Association of certain data may be accomplished through desired data association techniques such as those known or practiced in the art.

It should be understood that when an element is referred to as being "connected" or "coupled" to another element (or variations thereof), it can be directly connected or coupled to the other element or intervening elements may be present. In contrast, when an element is referred to as being "directly connected" or "directly coupled" to another element (or variations thereof), there are no intervening elements present.

Benefits, other advantages, and solutions to problems have been described herein with regard to specific embodiments. However, the benefits, advantages, solutions to problems, and elements that may cause any benefit, advantage, or solution to occur or become more pronounced are not to be construed as critical, required, or essential features or elements of the disclosure. It should be appreciated that in the appended claims, reference to an element in the singular is not intended to mean "one and only one" unless explicitly so stated, but rather "one or more."

Embodiments of the present disclosure are described herein with reference to the accompanying drawings. However, the present disclosure should not be construed as limited to the embodiments set forth herein. Rather, these embodiments are provided so that this disclosure will be thorough and complete, and will fully convey the scope of the present disclosure to those skilled in the art. As used herein, the singular forms "a," "an," and "the" are intended to include the plural forms as well, unless the context clearly indicates otherwise. It will be further understood that the terms "comprises," "comprising," "having," "includes," "including," and/or variations thereof, when used herein, specify the presence of stated features, steps, operations, elements, and/or components, but do not preclude the presence or addition of one or more other features, steps, operations, elements, components, and/or groups thereof.

Although illustrative embodiments of the present disclosure have been described herein with reference to the accompanying drawings, it is to be understood that the present disclosure is not limited to those precise embodiments, and that various other changes and modifications may be made by one skilled in the art without departing from the scope or spirit of the disclosure.

What is claimed is:

1. A device for performing targeted sanitization of confidential information, comprising:
   a memory;
   a processor operatively coupled to the memory; and
   a persistent storage device operatively coupled to the memory and storing, in a non-transitory manner, instructions that when loaded into the memory cause the at least one processor to be operative to:
   receive, by the processor, real-world data files indicating real-world occurrences;
   specifically store, by the processor, the real-world data files within a structured database;
   determine, by the processor, based on field name, whether confidential information exists within the received real-world data files;
   determine, by the processor, a type for identified confidential information on an individual field basis;
   secure, by the processor, the identified confidential information according to the type associated with the confidential information, each type of confidential information triggering a respective sanitization process, the respective sanitization process including switching processes wherein the switching processes comprise using a SQL server mod function to reassign a switch correlating to a value associated with a data file's location within a sorting order of the real-world data files within the structured database;
   packaging, by the processor, the real-world data files containing secured confidential information into a real-world scenario files; and
   transmitting, by the processor, the real-world scenario files to a cloud environment for storage.

2. The device of claim 1, wherein the respective sanitization process further includes RAND processes comprising manipulating a ROWID and a data value of the confidential information with a random number to generate an encrypted value, the ROWID and the data value being specific to a location of a real-world data file containing the confidential information within the structured database.

3. The device of claim 1, wherein the structured database comprises tables, each of the tables including information from multiple real-world data files that share a common feature, the common feature being a type of confidential information.

4. The device of claim 1, wherein the respective sanitization process further includes obfuscation processes comprising changing a common field value of confidential information of multiple real-world data files into generalized values, the generalized values being sequential numbers corresponding to a location of each of the real-world data files within the structured database.

5. A system, comprising: a local computing device receiving real-world data files;
   a data sanitization processor electrically interconnected to the local computing device, the data sanitization processor determining types of confidential information within received real-world data files, the data sanitization processor also securing confidential information according to a type associated within the confidential information, each type of confidential information triggering a respective sanitization process, the respective sanitization process including switching processes wherein the switching processes comprise using a SQL server mod function to reassign a switch correlating to a value associated with a data file's location within a sorting order of the real-world data files within a structured database, the data sanitization processor also packaging the real-world data files containing secured confidential information into real-world scenario files; and the data sanitization processor electrically interconnected to a cloud storage environment and transmitting the real-world scenario files to the cloud storage environment for storing the real-world scenario files.

6. The system of claim 5, wherein the structured database is electrically interconnected to the local computing device and the data sanitization processor, the structured database comprising tables that each include information from multiple real-world data files sharing a common feature, the common feature being a type of confidential information.

7. The system of claim 5, wherein the respective sanitization process further includes at least one of RAND processes or obfuscation processes.

8. The system of claim 7, wherein the RAND processes comprise manipulating a ROWID and a data value of the confidential information with a random number to generate an encrypted value.

9. The system of claim 7, wherein the obfuscation processes comprise changing a common field value of confidential information of multiple real-world data files into generalized values, the generalized values being sequential numbers.

10. The system of claim 5, wherein the data sanitization processor further identifies confidential information based on forms of information within the real-world data files.

11. The system of claim 5, wherein the data sanitization processor further identifies confidential information based on magnitudes of information within the real-world data files.

12. The system of claim 5, wherein the data sanitization processor further identifies a degree of confidentiality of confidential information.

13. The system of claim 12, wherein the data sanitization processor secures confidential information based on the degree of confidentiality of the confidential information.

14. The system of claim 13, wherein each degree of confidentiality triggers a respective sanitization process.

15. A method implemented on a data processing system identifying and securing confidential information, the method comprising:

receiving, by the data processing system, a real-world data file indicating real-world occurrences;

determining, by the data processing system, confidential information exists within the received real-world data file;

determining, by the data processing system, a type for the confidential information;

securing, by the data processing system, the confidential information according to the type associated with the confidential information, each type of confidential information triggering a respective sanitization process, the respective sanitization process including switching processes wherein the switching processes comprise using a SQL server mod function to reassign a switch correlating to a value associated with a data file's location within a sorting order of the real-world data files within a structured database;

packaging, by the data processing system, the real-world data file containing secured confidential information into a real-world scenario file; and transmitting, by the data processing system, the real-world scenario file to a cloud environment.

16. The method of claim 15, wherein confidential information is determined to exist based on field name of the confidential information within a structured database.

17. The method of claim 15, wherein confidential information is determined to exist based on a form of data within the real-world data file.

18. The method of claim 15, wherein confidential information is determined to exists based on a magnitude of information within the real-world data file.

19. The method of claim 15, wherein the respective sanitization process further includes at least one of RAND processes or obfuscation processes;

the RAND processes comprise manipulating a ROWID and a data value of the confidential information with a random number to generate an encrypted value; the obfuscation processes comprise changing a common field value of confidential information of multiple real-world data files into generalized values, the generalized values being sequential numbers corresponding to a location of each of the real-world data files within the structured database; and the switching processes comprise using a SQL server mod function to reassign a switch correlating to ROWID value of the real-world data file within the structured database.

20. A device for performing targeted sanitization of confidential information, comprising:

a memory;

at least one processor operatively coupled to the memory; and a persistent storage device operatively coupled to the memory and storing, in a non-transitory manner, instructions that when loaded into the memory cause the at least one processor to be operative to:

receive real-world data files indicating real-world occurrences;

specifically store the real-world data files within a structured database;

determine, based on field name, whether confidential information exists within the received real-world data files;

determine a type for identified confidential information on an individual field basis;

secure the identified confidential information according to the type associated with the confidential information, each type of confidential information triggering a respective sanitization process, the respective sanitization process including switching processes wherein the switching processes comprise using a SQL server mod function to reassign a switch correlating to a value associated with a data file's location within a sorting order of the real-world data files within the structured database;

packaging the real-world data files containing secured confidential information into a real-world scenario files; and transmitting the real-world scenario files to a cloud environment for storage.

\* \* \* \* \*